United States Patent [19]

Malec

[11] 4,375,788
[45] Mar. 8, 1983

[54] TIRE MONITOR

[75] Inventor: Jerry P. Malec, Omaha, Nebr.

[73] Assignee: Allied Transportation Specialties, Inc., Omaha, Nebr.

[21] Appl. No.: 228,253

[22] Filed: Jan. 26, 1981

[51] Int. Cl.³ .............................................. B60C 23/04
[52] U.S. Cl. .................. 116/34 R; 116/271; 73/146.8
[58] Field of Search ............... 116/34 R, 272, 271, 116/277; 73/146.3, 146.8; 137/227, 228, 229

[56] References Cited

U.S. PATENT DOCUMENTS

| | | | |
|---|---|---|---|
| 1,229,860 | 6/1917 | Ashelman | 73/146.8 |
| 2,325,415 | 7/1943 | McKinley | 116/271 |
| 2,505,118 | 4/1950 | Holmes | 116/271 |
| 2,800,795 | 7/1957 | Trinca | 116/271 |
| 3,357,240 | 12/1967 | Bordwick | 73/146.8 |
| 3,977,355 | 8/1976 | Lorenz | 116/34 R |

FOREIGN PATENT DOCUMENTS 450235  7/1949 Italy .................................. 73/146.3

*Primary Examiner*—Charles A. Ruehl
*Assistant Examiner*—Denis E. Corr
*Attorney, Agent, or Firm*—Zarley, McKee, Thomte, Voorhees & Sease

[57] ABSTRACT

A pressure equalizing valve for pneumatic tires including a visual display is described which is ideally suited for use with dual tires. A cylindrical housing accommodates a spring biased diaphragm mounted in a first chamber. The diaphragm carries a valve member thereon and acts as a sealing member or element to close two air passageways which are in communication with the dual tires in a conventional dual tire installation. The valve member closes the air passageways when a pre-adjusted and calibrated value of air pressure is lost by the dual tires involved. Changes in the air pressures acting on the spring biased diaphragm are communicated to a diaphragm follower on the atmospheric side of the diaphragm. A visual display is operated with the diaphragm follower and responds at an eight to one ratio to the movement of the diaphragm and follower when air pressure changes occur and a resultant movement of the diaphragm and follower occurs.

10 Claims, 8 Drawing Figures

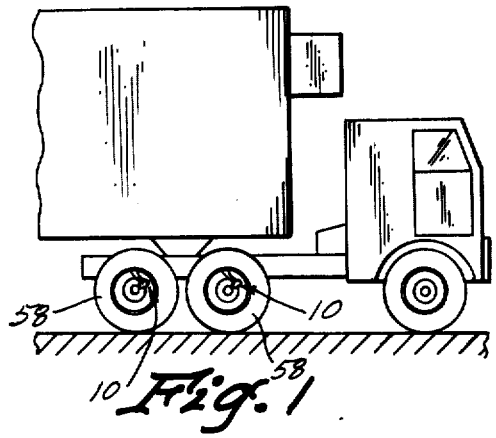
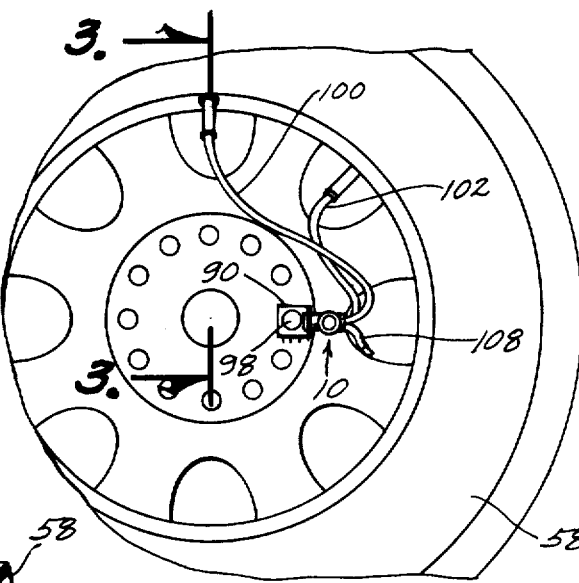
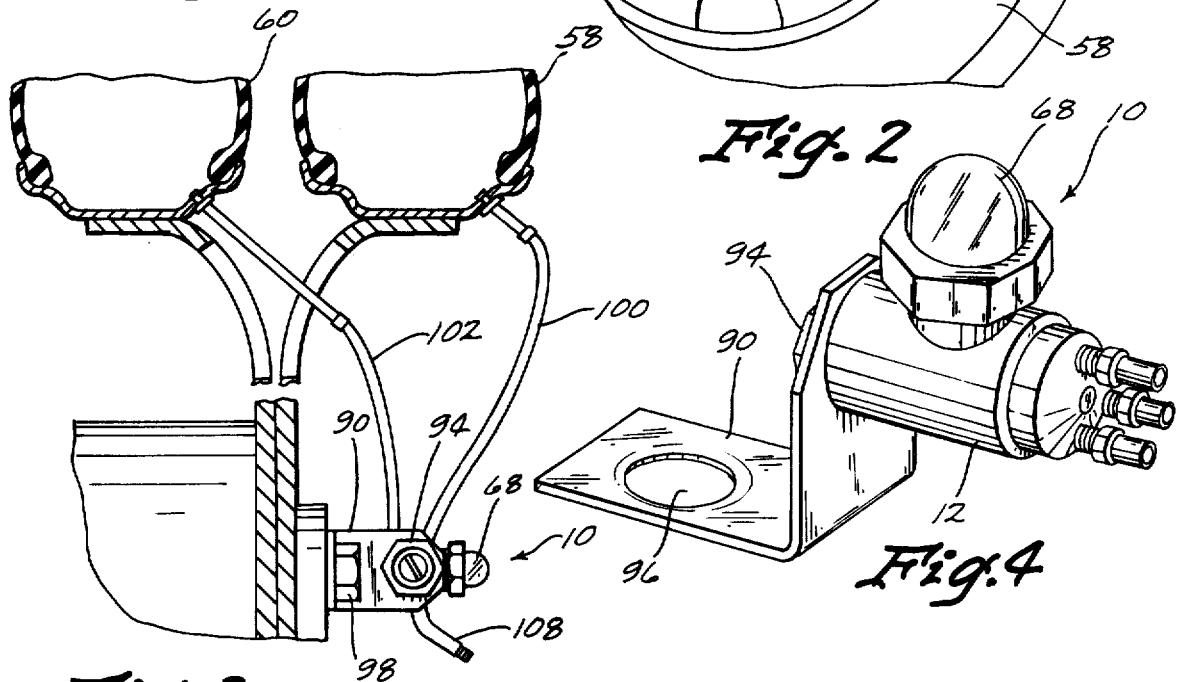
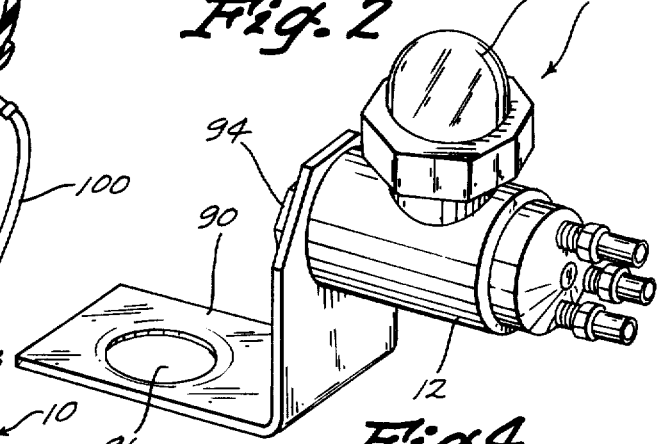
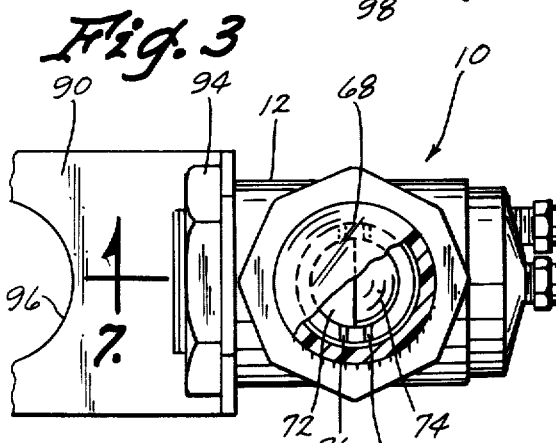
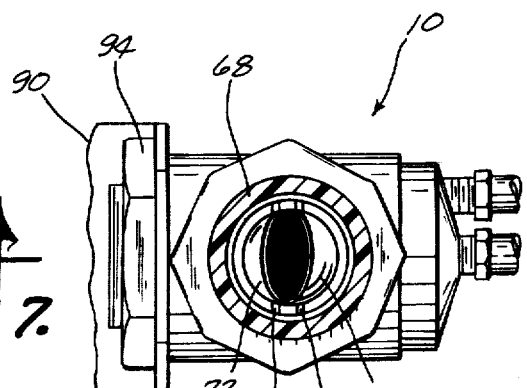

TIRE MONITOR

BACKGROUND OF THE INVENTION

This invention relates to a tire monitor device and more particularly to a pressure equalizing valve for pneumatic tires which includes a visual display means.

A very large number of previous devices have been provided which attempt to either equalize the pressure between a pair of dual tires or to indicate to the operator that a low pressure condition exists in one or both of the tires. Disadvantages of certain of the prior art devices which equalize air between the dual tires are that they are not sufficiently sensitive to changes in tire pressure and certain of the devices permit the air in both tires to be lost if one of the tires experiences a sudden drop in pressure. A further disadvantage of some of the prior art devices is that they are not durable and frequently malfunction. A still further disadvantage of certain of the prior art devices is that they become contaminated with moisture and will freeze during periods of cold weather. Still another disadvantage in the prior art is that if the pressure sensing means thereof ruptures or fails due to a leak or poor seal, the device will sometimes permit complete loss of air from one tire.

A vast majority of the prior art devices which include means for warning the operator of low tire pressures is that they are electronic in nature and do experience some malfunctions. Further, the electronic devices are extremely expensive.

Therefore, it is a principal object of the invention to provide an improved tire monitor.

A further object of the invention is to provide a pressure equalizing valve for pneumatic tires which includes a visual display means.

A further object of the invention is to provide a tire monitor including means for supplying air to the tires without the necessity of a pressure gauge.

A further object of the invention is to provide a tire monitor which is durable in use and which includes means for preventing the accumulation of moisture within the display side of the mechanism.

A further object of the invention is to provide a tire monitor which includes means for maintaining the unpressurized side of the diaphragm at atmospheric pressure.

A still further object of the invention is to provide a tire monitor including a visual display means having a difference in colors so that the display means will be readily visible.

A further object of the invention is to provide a pressure equalizing valve for pneumatic tires which prevents loss of air from both tires should one of the tires experience a sudden drop in pressure.

A further object of the invention is to provide a device of the type described wherein the visual display means will not be damaged upon being exposed to high pneumatic pressures.

A still further object of the invention is to provide a pressure equalizing valve of the type described which is economical of manufacture.

These and other objects will be apparent to those skilled in the art.

BRIEF DESCRIPTION OF THE DRAWINGS

FIG. 1 is a side view of a truck illustrating the manner in which the tire monitor of this invention is mounted on the dual wheels of the truck;

FIG. 2 is a plan view illustrating the manner in which the tire monitor of this invention is mounted on the dual wheels:

FIG. 3 is an enlarged sectional view taken on lines 3—3 of FIG. 2:

FIG. 4 is a perspective view of the tire monitor of this invention together with the means for mounting the same on the tire:

FIG. 5 is a top view of the tire monitor with portions thereof cut away to more fully illustrate the invention:

FIG. 6 is a view similar to FIG. 5 except that the display means indicates a low pressure situation:

SUMMARY OF THE INVENTION

Figure 7:
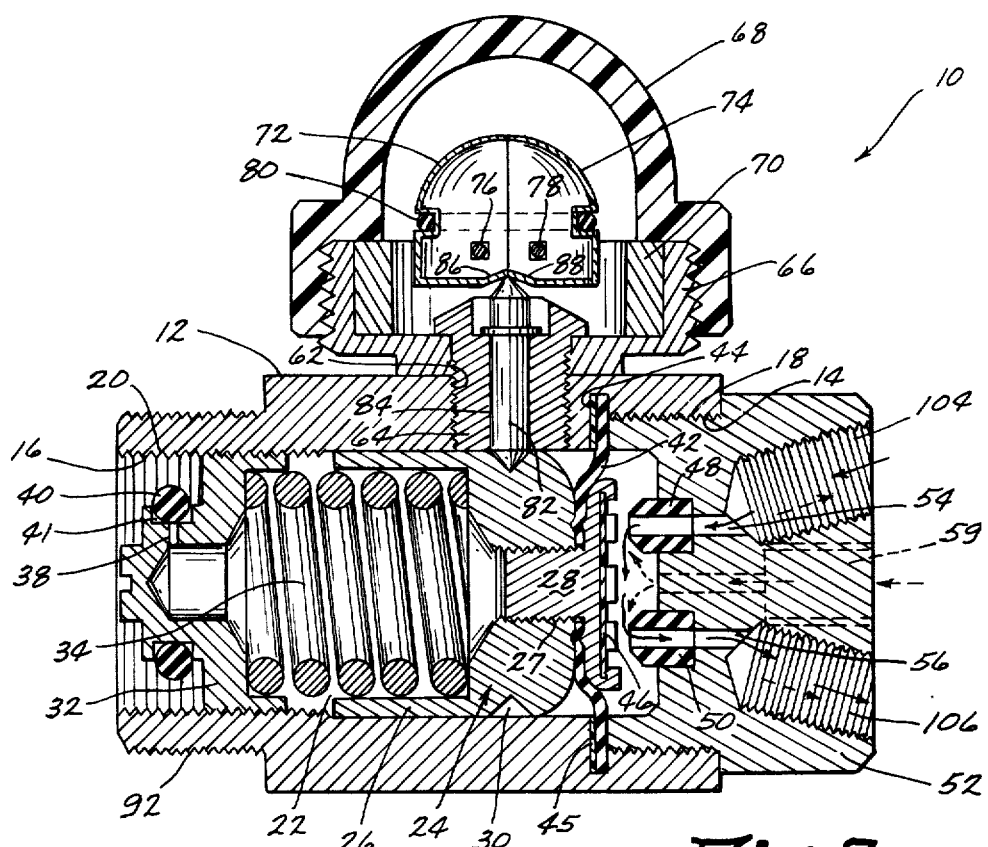
FIG. 7 is a sectional view taken on lines 7—7 of FIG. 5.

A tire monitor is described herein which includes a cylindrical body member which has a first chamber formed therein. A spring biased diaphragm is mounted in the first chamber and is urged towards one end of the body member. A valve member is carried on the pressure side of the diaphragm and is movable therewith between open and closed positions relative to a pair of valve seats which are in communication with the tires. A visual display means is operated by a follower mechanism connected to the diaphragm so that low pressure and predetermined adequate tire pressures are indicated. Means is also provided to supply air to the two tires through the body member.

DESCRIPTION OF THE PREFERRED EMBODIMENT

The numeral 10 refers generally to the tire monitor of this invention. Tire monitor 10 includes a cylindrical valve body or body member 12 having open ends 14 and 16 respectively. As seen in the drawings, the open ends 14 and 16 are provided with internal threads 18 and 20 respectively. Valve body 12 is provided with a cylindrical chamber 22 having piston 24 slidably mounted therein. Piston 24 includes a skirt portion 26 and a threaded central opening 27 at one end thereof. Opening 27 is adapted to threadably receive valve head 28 as will be described in more detail hereinafter. Piston 24 has a V-shaped annular ramp 30 formed in the periphery thereof.

Spring adjustment nut 32 closes end 16 as best illustrated in FIG. 7. Spring 34 is positioned in chamber 22 between spring adjustment nut 32 and piston 24 for yieldably urging piston 24 to the right as viewed in FIG. 7. Spring adjustment nut 32 has a central passageway 36 formed in the inside surface thereof which communicates with port 38 extending radially therefrom. Port 38 is selectively closed by resilient O-ring 40 positioned in groove 41 which acts as a one-way check valve as will be discussed in more detail hereinafter.

The numeral 42 refers to a diaphragm positioned in body member 12 in a manner seen in FIG. 7. Washer 44 is positioned at one side of the diaphragm 42 between the diaphragm and shoulder portion 45 of body member 12. Diaphragm 42 has a central opening formed therein which receives valve head 28 whereby diaphragm 42 will move with piston 24 and valve head 28. Valve head 28 includes an valve member 46 adapted to sealably engage the valve seats 48 and 50 mounted in valve cap 52 which is threadably received by valve body 12. Valve cap 52 is provided with a pair of air passageways 54 and 56 which are in communication with ports 104 and 106 respectively and with the interior of the tires 58 and 60 respectively. As seen in the drawings, air passageways 54 and 56 are in communication with the valve seats 48 and 50. Valve caps 52 is also provided with an air passageway 59 which communicates with the pressurized side of the diaphragm 42 as will be described in greater detail hereinafter.

Valve body 12 has a threaded opening 62 formed therein which threadably receives housing screw 64 having housing 66 mounted thereon. Sight glass 68 is threadably mounted on housing 66 and positions the frame 70 as illustrated. Eye portions 72 and 74 are pivotally mounted on frame 70 by means of pins 76 and 78. The eye portions 72 and 74 are pivotally movable from the closed position illustrated in FIG. 7 to the open position illustrated in FIG. 8. Resilient O-ring 80 extends around the eye portions 72 and 74 to yieldably maintain the eye portions in the closed position of FIG. 7. When in the closed position, the eye portions 72 and 74 define a generally closed cylindrical shape but define a "cat's-eye" configuration when in the open position. The "cat's-eye" configuration is further defined by the fact that the exterior surfaces of eye portions 72 and 74 are painted a bright color such as yellow and the interior surfaces are painted a dark color such as black.

Figure 8:
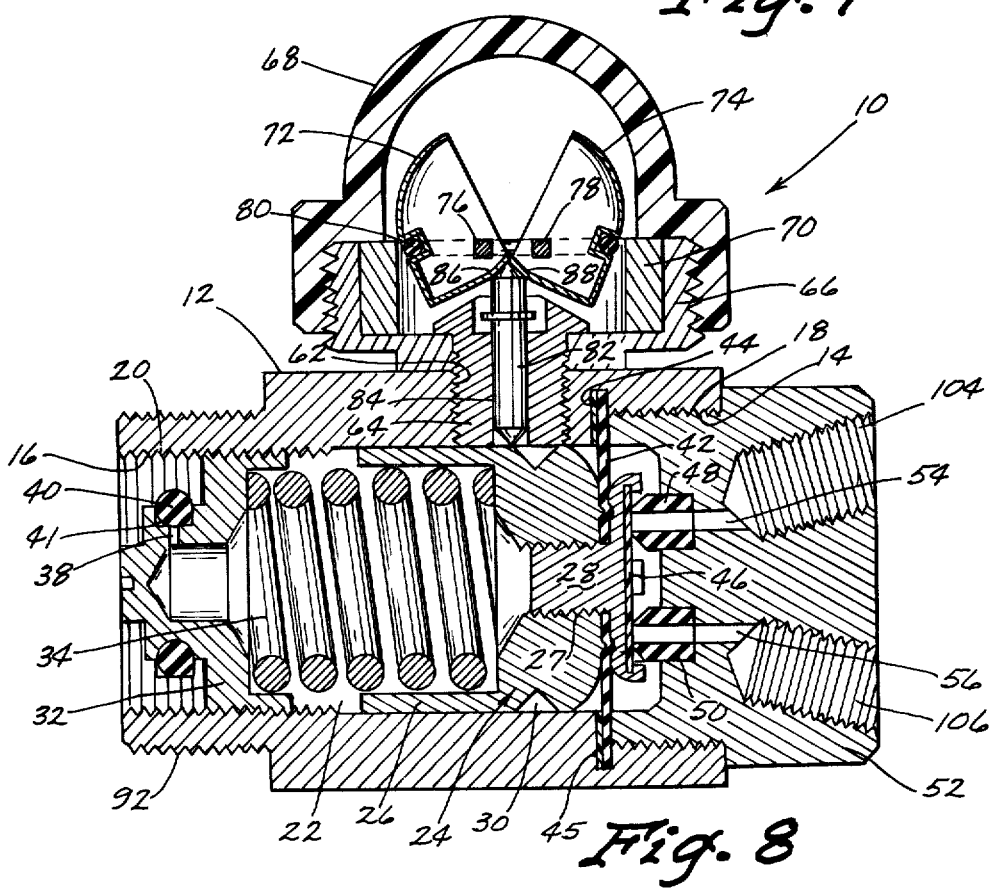
FIG. 8 is a sectional view similar to FIG. 7 except that the valve in the tire monitor is in its closed position.

Actuator pin 82 is slidably mounted in bore 84 formed in housing screw 64. Pin 82 has one end which is beveled at 45 degrees and which is received by the ramp 30. The other end of pin 82 is received by the inner end portions 86 and 88 of the eye portions 72 and 74 respectively, as seen in FIGS. 7 and 8. Thus, when valve member 46 is in engagement with valve seats 48 and 50 (FIG. 8), actuator pin 82 will be extended so that the eye portions 72 and 74 will be in the open position of FIG. 8. Conversely, when the valve member 46 has been moved out of seating engagement with the valve seats 48 and 50, pin 82 will be in the retracted position so that the eye portions 72 and 74 will be in the closed position of FIG. 7.

The numeral 90 refers to a L-shaped bracket having one end thereof received by the externally threaded portion 92 of valve body 12 and which is maintained thereon by means of nut 94 threadably mounted on the threaded portion 92. Bracket 90 also includes an opening 96 formed therein which is adapted to be positioned on one of the lug bolts of the dual tire arrangement as illustrated in FIGS. 2 and 3 and maintained thereon by the lug nut 98. When the bracket 90 and the tire monitor 10 is mounted on the dual tire installation as illustrated in FIG. 3, the sight glass 68 will be clearly visible to a person standing adjacent thereto. Hoses 100 and 102 connect the tires 58 and 60 respectively to the ports 104 and 106 formed in the end of valve cap 52 so as to be in communication with the passageways 54 and 56 respectively. A conventional valve stem 108, with conventional internal valve means, is placed in communication with the air passageway 59.

The spring adjustment 32 is rotated to the desired position to achieve the proper calibration of the spring 34. The adjustment of the spring 34 will depend upon the particular dual tire installation. Air is supplied to the interior of the tires 58 and 60 by supplying air to the valve stem 108. Air entering passageway 59 from valve stem 108 will cause the piston 24 and valve member 46 to move to the left as illustrated in FIG. 7 so that the air exiting from passageway 59 may flow outwardly through the passageways 54 and 56 to the tires 58 and 60. Air is supplied to the valve stem 108 until the eye portions 72 and 74 move to their closed positions. It should be understood that the initial supply of air to passageway 59 through the valve stem 108 will just slightly move the valve member 46 out of seating engagement with the valve seats 48 and 50. When sufficient air has been supplied to the tires 58 and 60 determined by the calibration of the spring 34, the eye portions 72 and 74 will close which will indicate to the operator that sufficient air pressure is present and such is determined without the need of a tire pressure gauge.

The valve member 46 remains open during operation of the truck as long as the predetermined desirable pressure is present in the tires 58 and 60. The air pressure between the tires 58 and 60 will automatically equalize since air from one tire may pass to the other through the passageways 54 and 56. If one of the tires should experience a loss of pressure, the pressure at the pressurized side of the diaphragm will not be sufficient to maintain the valve member 46 in the position of FIG. 7 and the valve member 46 will move to the seating position on the valve seats 48 and 50 as illustrated in FIG. 8. As the valve member 46 moves from the position of FIG. 7 to the position of FIG. 8, pin 82 is urged outwardly so that its outer end pivotally moves the eye portions 72 and 74 from the position of FIG. 7 to the position of FIG. 8. The relationship between the ramp 30, pin 82 and the eye portions 72 and 74 are such that approximately an eight to one advantage is obtained. In other words, the eye portions 72 and 74 will be moved approximately eight times greater than the movement experienced by the piston 24.

The movement of the valve member 46 from the position of FIG. 7 to the position of FIG. 8 causes the eye portions 72 and 74 to move to the open position as illustrated in FIG. 8 and the truck operator will be readily advised of the low tire pressure due to the fact that the "cat's-eye" configuration is visible. The relationship of the valve member 46 and the valve seats 48 and 50 is such that a sudden loss of pressure in one of the tires will not cause the pressure in the other tire to also be lost since the spring 34 will urge the valve member 46 into sealing engagement with the ports 48 and 50 when a predetermined loss of pressure is experienced as set by the spring adjustment nut 32. The atmospheric side of the diaphragm is vented by means of the port 38 which is closed by the O-ring 40. Thus, the atmospheric side of the diaphragm is exposed to the atmosphere to permit any accumulated air to escape from the interior of the device and to prevent water or contaminants from entering the mechanism.

It is extremely important to note that the exterior portion of the eye portions 72 and 74 are painted in a highly visible color such as yellow or the like with the interiors of the eye portions 72 and 74 being painted a dark color such as black or the like. The black interior surfaces of the eye portions 72 and 74 become highly visible when the eye portions are moved to their open position so that the "cat's-eye" is extremely noticeable.

It is also very important to note that the device of this invention does not permit the complete loss of air from one tire should the apparatus become ruptured or fail due to a poor seal or leak. The prior art devices ordinarily prevent a loss of air from at least one tire if the device fails.

Thus it can be seen that a novel tire monitor has been provided which accomplishes at least all of its stated objectives.

I claim:

1. A tire monitor for use with a pair of pneumatic tires comprising,
   a body member having first and second ends, said body member having a first chamber formed therein,
   a diaphragm mounted in said first chamber between said first and second ends to define first and second chamber portions,
   a spring means in said first chamber portion at one side of said diaphragm yieldably urging said diaphragm towards said first end,
   a valve member at the other side of said diaphragm and movable therewith between first and second positions,
   a valve cap means secured to said first end of said body member and having a first air passageway formed therein in communication with the interior of one of said tires a second air passageway formed therein in communication with the interior of the other of said tires, and a third air passageway formed therein in communication with said second chamber portion,
   valve means connected to said third passageway to permit air under pressure to be supplied to said second chamber portion at times,
   said valve member preventing communication between said first and second air passageways when said valve member is in its said first position and preventing communication between said third air passageway and said first and second air passageways when said valve member is in its said first position,
   said valve member allowing communication between said first and second air passageways when said valve member is in its said second position and allowing communication between said third air passageway and said first and second air passageways when said valve member is in its said second position,
   said spring means yieldably urging said valve member towards its said first position with the air pressure in said first and second air passageways urging said valve member towards its said second position,
   and a one-way exhaust passageway in communication with said first chamber portion to permit air and moisture to escape from said first chamber portion.

2. The tire monitor of claim 1 wherein said body member has a selectively closable open end at its said second end, and a spring adjustment nut threadably mounted in said open end for selected adjusting the tension of said spring means.

3. The tire monitor of claim 1 wherein said spring means causes said valve member to move to its said first position to prevent communication between said first and second air passageways if one of the tires experiences a predetermined loss of pressure.

4. A tire monitor for use with a pair of pneumatic tires comprising,
   a body member having first and second ends, said body member having a first chamber formed therein,
   a diaphragm mounted in said first chamber between said first and second ends to define first and second chamber portions,
   a spring in said first chamber portion at one side of said diaphragm yieldably urging said diaphragm towards said first end,
   a valve member at the other side of said diaphragm and movable therewith between first and second positions,
   a valve cap means secured to said first end of said body member and having a first air passageway formed therein in communication with the interior of one of said tires, a second air passageway formed therein in communication with the interior of the other of said tires, and a third air passageway formed therein in communication with said second chamber portion,
   valve means connected to said third passageway to permit air under pressure to be supplied to said second chamber portion at times,
   said valve member preventing communication between said first and second air passageways when said valve member is in its said first position and preventing communication between said third air passageway and said first and second air passageways when said valve member is in its said first position,
   said valve member allowing communication between said first and second air passageways when said valve member is in its said second position and allowing communication between said third air passageway and said first and second air passageways when said valve member is in its said second position,
   said spring means yieldably urging said valve means towards its said first position with the air pressure in said first and second air passageways urging said valve member toward its said second position,
   a visual indicator means operatively mechanically connected to said valve member for indicating the relative position of said valve member with respect to said first and second air passageways,
   and a one-way exhaust passageway in communication with said first chamber portion to permit air to escape from said first chamber portion.

5. The tire monitor of claim 4 wherein a cylindrical piston is slidably mounted in said first chamber portion, the center portion of said diaphragm being operatively secured to said piston for movement therewith, said spring means being in engagement with said piston for yieldably urging said valve member towards its said first position, said piston having a ramp formed in the periphery thereof, an actuator pin slidably mounted in said body member, said actuator pin having one end thereof received by said ramp and extending therefrom transversely with respect to the longitudinal movement of said piston, said visual indicator means being movable between open and closed positions, the other end of said actuator pin being in operative engagement with said visual indicator means for moving said visual indicator means to its said open position when said valve member is in its said first position.

6. The tire monitor of claim 5 wherein said visual indicator means comprises first and second arcuate members operatively pivotally secured together, said arcuate members defining a "cat's-eye" configuration when in their said open position.

7. The tire monitor of claim 6 wherein the relationship of said piston, ramp, pin actuator and said first and second arcuate members causes a substantially greater movement of said arcuate members than is experienced by said piston.

8. The tire monitor of claim 6 wherein said first and second arcuate members each have interior and exterior surfaces, said exterior surfaces being brightly colored with the interior surfaces being darkly colored.

9. The tire monitor of claim 4 wherein said visual indicator means indicates the said relative position by changing its color and shape in response to movement of said valve member.

10. The tire monitor of claim 4 wherein said visual indicator means is mechanically connected to said valve member.

* * * * *